Aug. 11, 1964  W. H. PARKER  3,143,809
BRAKE SHOE SETTING GAUGE
Filed Sept. 27, 1960
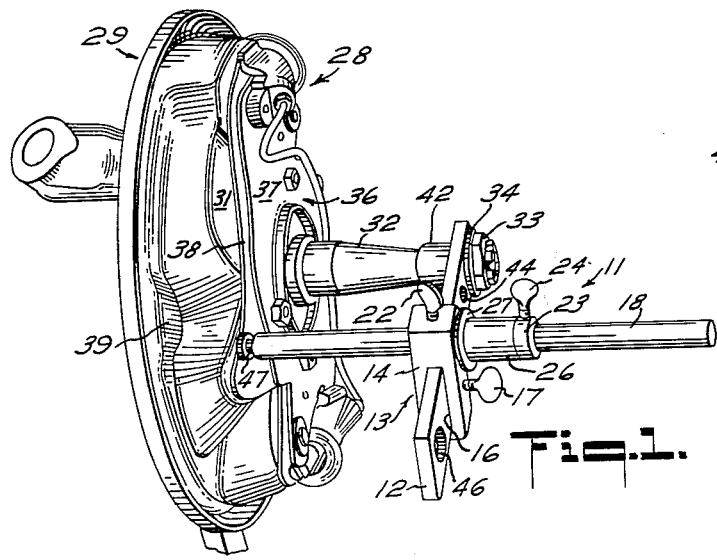
Fig.1.
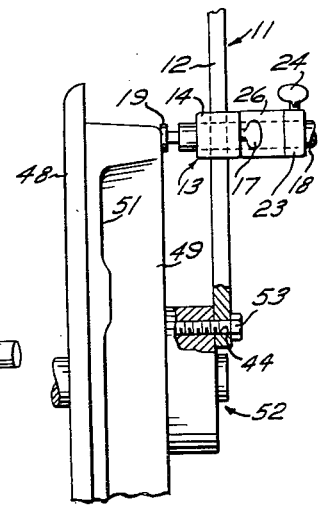
Fig.4.
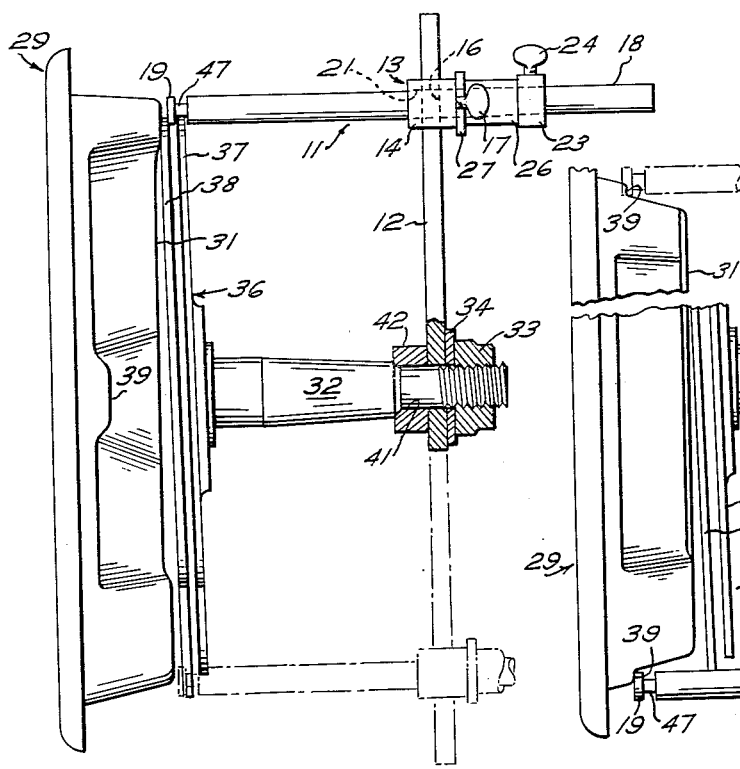
Fig.3.
Fig.2.
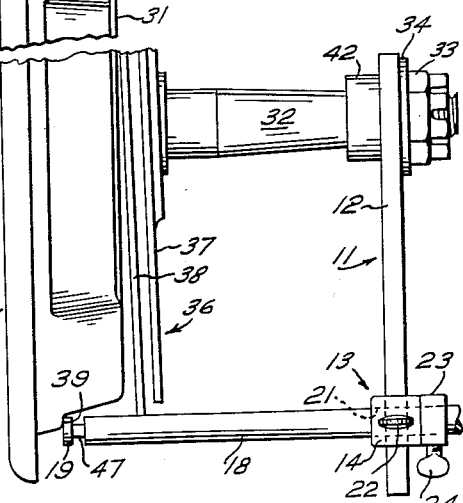
INVENTOR.
WARREN H. PARKER
BY
Gardner + Zimmerman
ATTORNEYS

United States Patent Office 3,143,809
Patented Aug. 11, 1964

3,143,809
BRAKE SHOE SETTING GAUGE
Warren H. Parker, 2851 Morgan Ave., Oakland, Calif., assignor of one-fourth to Charles W. Butler, one-fourth to Charles Bork, Oakland, Calif., and one-fourth to Norris O. Knutson, Danville, Calif.
Filed Sept. 27, 1960, Ser. No. 58,676
4 Claims. (Cl. 33—180)

This invention relates to gauge devices for aiding in the proper setting of automotive brake shoes, and is particularly directed to a depth gauge for checking various portions of a brake shoe mounting assembly and detecting departures from parallel planar relationships therebetween requisite to the proper setting of brake shoes mounted in the assembly.

One of the difficulties frequently encountered in the mounting of brake shoes in present day brake assemblies is that of the backing plate or dust shield and various other portions of the assembly being bent or otherwise deformed to an extent that the brake shoes cannot be properly set therein. More particularly, where the backing plate and means for mounting the brake shoes relative to the backing plate are not respectively everywhere in parallel suitably spaced transverse planes passing through the spindle as occurs upon bending of either or both elements, the brake shoes are likely to bind against the plate, as well as other elements of the assembly. Grabbing of the brake lining upon the drum is also very likely to occur as a result of the foregoing.

In order that brake shoes be properly set in a brake assembly in proper functioning relationship it is accordingly necessary that the backing plate and brake shoe mounting means be in transverse parallelism relative to the spindle and suitably spaced before the brake shoes are installed in the assembly. To this end it is desirable that a gauge be provided for quickly checking the elements of the assembly for transverse parallelism relative to the spindle and proper predetermined spacing from each other. Elements observed to depart from these conditions may then be corrected or replaced before the brake shoes are set in the assembly.

It is, therefore, an object of the present invention to provide a gauge for checking the backing plate and brake shoe mounting means of a brake assembly for properly spaced transversely planar parallelism relative to the spindle.

Another object of the invention is the provision of a method of setting brake shoes in a brake assembly by measuring the depths of a plurality of points on elements of the assembly from a transverse reference plane through the spindle as an indication of the proper parallelism and spacing of the elements to receive the brake shoes.

It is still another object of the invention to provide a depth gauge for all types of brake assemblies to ascertain the proper condition of such assemblies to receive the brake shoes employed therewith.

Yet another object of the invention is to provide for the proper setting of brake shoes by means of a depth gauge.

It is a further object of the invention to provide a depth gauge for setting brake shoes which is extremely simple and economical in construction.

It is a still further object of the present invention to provide a depth gauge for checking a plurality of points on the rear plate of a support spider of a brake assembly relative to any given point axially of the brake assembly spindle so as to determine the presence of any undesirable deviation in such plate.

It is another object of the present invention to provide a gauge of the character described which may be readily mounted on a brake unit by the use of securing means which are a part of the brake unit.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a perspective view of the brake shoe setting gauge of the present invention as employed to gauge elements of floating center plane full contact brakes.

FIGURE 2 is a side elevational view of the gauge as utilized with the brakes of FIGURE 1, and illustrating particularly the gauging of the rear plate of the support spider to which the brake shoes are secured.

FIGURE 3 is a view similar to FIGURE 2, but illustrating the use of the gauge in gauging the backing plate or dust shield of the assembly for proper relation relative to the rear plate of the support spider, and FIGURE 4 is a side elevational view of the gauge as employed to gauge a brake assembly of entirely different design than that of FIGURES 1 to 3.

Considering now the invention in detail and referring to the drawing, there will be seen to be provided a depth gauge 11 for assisting in the proper mounting of brake shoes in a brake assembly. The gauge includes a radial arm 12, preferably of rectangular cross-section, which is arranged for substantially end attachment to any axle spindle in present use in such a manner that the arm may be rotated about the axis of the spindle to define a transverse reference plane therethrough. The arm carries a yoke 13 which is slidable axially thereof and therefore radially of a spindle to which the arm is attached. The yoke is preferably provided as a rectangular block 14 having a rectangular slot 16 parallel to opposite side faces thereof for receiving the arm 12 in sliding relation. In addition, provision is made to set or lock the yoke at any position along the arm and this may be accomplished as by means of a set screw 17. The set screw threadably engages a tapped bore in one of the side faces of the block 14 which is parallel to the slot 16, the bore extending into intersection therewith. Upon sliding the yoke block to any desired position along the arm, the block may hence be set in the position by tightening the set screw 17.

As a further element of the gauge, there is provided a depth gauging bar 18 which is arranged for slidable translation relative to the yoke in right angular relation to the arm 12. The bar 18 is hence disposed in parallel relation to the axis of a spindle to which the arm 12 is attached. When the rod is in a fixed position relative to the yoke, and the arm is rotated about a spindle, the probe end 19 of the rod hence describes a transverse plane through the spindle axis at a distance from the transverse reference plane determined by the particular fixed position of the rod. In the preferred embodiment, slidable translation of the rod relative to the yoke and fixing of the rod in any position of translation is facilitated by means of a bore 21 through the block 14 in transverse relation to the slot 16 but spaced therefrom so as not to intersect same. The bore 21 is of suitable configuration and size to slidably receive the rod and a set screw 22 is threaded into a tapped bore through the block into intersection with the bore 21. Thus the rod 18 may be translated through the bore 21 and locked in any desired position by means of the set screw 22.

In order that the gauging bar 18 be readily positioned to gauge transverse planes of predetermined separation axially of a spindle, a stop collar 23 is mounted in axially slidable relation upon the gauging bar and a radially extending set screw 24 is carried by the collar to selectively lock same to the bar. Several depth gauging spacing members 26, 27 are then provided for concentric disposition about the bar intermediate the collar and yoke. These members 26, 27 are of a thickness corresponding to the spacing between transverse planes to be gauged, such thickness being predetermined in accordance with considerations subsequently described. It will be appreciated that with the foregoing arrangement the set screws 22, 24 may be loosened such that the gauging bar 18, collar 23, and spacing members 26, 27 are free for translation. The bar may then be translated relative to the yoke until the probe end 19 is positioned commensurate with a first transverse plane to be gauged. The set screw 22 may now be tightened to secure the position of the bar in the yoke and the spacing members 26, 27 and collar 23 moved along the bar into respective end to end abutment against the yoke. The set screw 24 is then tightened to lock the collar upon the bar, the gauging members being thus retained in fixed position between the collar and yoke. When the arm 12 is rotated about a spindle, the probe end 19 of the gauging bar describes a plurality of points all lying in the first transverse plane. In order that the probe end describe points in a second transverse plane spaced from the first by the predetermined separation to be gauged, it is only necessary to loosen the set screw 22, thereby freeing the gauging bar for translation relative to the yoke. With the collar retained in locked position on the gauging bar, the bar is removed from the yoke and the gauging members 26, 27 withdrawn from the bar. The bar is then replaced in the yoke and translated to a position where the collar abuts the yoke. The bar is thus positioned with the probe end disposed at the second transverse plane and this position of the bar can be retained by tightening the set screw 22.

Considering now the manner in which the gauge 11 may be used to check brake assemblies to insure the proper setting of brake shoes therein, the use of the gauge with one type of brake is depicted in FIGURES 1 to 3. More particularly, a floating center plane total contact brake assembly 28 is shown which includes a dust shield or backing plate 29 with a central raised region 31. At the center of the raised region an aperture is provided through which a spindle 32 extends, the spindle in this case being tapered. The end of the spindle is threaded to receive a nut 33 and washer 34. The raised center region 31 also serves to mount a support spider 36 which includes parallel spaced plates 37, 38 arranged to receive the web portions of brake shoes therebetween. When brake shoes are secured to the spider plates, the peripheral contact surfaces of the shoes circumscribe the raised portion of the backing plate with the side edges of the shoes in closely spaced relation to the lower peripheral portion of the backing plate. When the spider plates and backing plate are in proper condition, the edges of the brake shoes will be everywhere equally spaced from the lower peripheral portion of the backing plate. More specifically, the edges of the brake shoes will be parallel to and spaced from bosses or platforms 39 formed in the peripheral portion of the backing plate by a predetermined clearance. To insure the foregoing positioning of the brake shoes, the spider plates and backing plate must be transversely planar relative to the spindle and the lower spider plate spaced from the platforms by an amount equal to the distance from the web to the edge of the brake shoes plus the predetermined clearance from the platforms. These conditions are destroyed where the backing plate, lower spider plate, or both are bent or otherwise deformed.

With the foregoing in mind, the gauge 11 is utilized to check the brake assembly 28 by first securing the radial arm 12 of the gauge to the spindle 32. Where the threaded end of the spindle terminates in a flat shoulder, the existing nut 33 and washer 34 are all that are required to secure the arm 12 to the spindle. More specifically, the arm is provided with an aperture 41 at one end for traversal by a tapered spindle axle. Thus where the spindle is flat shouldered at the termination of the threaded portion, the arm may be placed against the shoulder, the spindle extending through the aperture 41, and the nut and washer secured to the spindle to secure the arm in transversely planar relation thereto. In other spindles, such as the spindle 32, the threaded end terminates in a beveled shoulder and accordingly a flat bearing surface for the arm 12 is not provided. A bearing 42, conformed at one face to the beveled shoulder and flat at the opposite face, must then be utilized in conjunction with the spindle to present a flat transversely planar bearing surface to the arm. In this respect it will be noted that the bearing 42, nut 33, and washer 34, are preferably elements of an individual brake assembly and are utilized for subsequently mounting a wheel on the spindle. In this way the gauging device may be readily mounted on and secured to the spindle without requiring the use of additional loose parts that may be easily lost. Other types of axles may, of course, be encountered in different types of brake assemblies and accordingly the arm 12 is also adapted for securance thereto. To this end an aperture 44 of smaller diameter is provided adjacent to aperture 41 to receive a lug bolt of a flanged axle. In addition, an aperture 46 of a size to receive a straight spindle is provided at the opposite end of the arm.

With the radial arm of the gauge secured to the spindle in transverse relation thereto, the yoke block 14 is slid along the arm to a position where the probe end 19 of the gauging bar 18 is adjacent the peripheral portions of the lower spider plate 38. The set screw 17 may then be tightened to lock the yoke in position. With the stop collar 23 and gauging elements 26, 27 on the bar, the bar is moved through the yoke until the probe end 19 contacts a point of the spider plate 38. The set screws 22, 24 are then tightened to retain the elements of the gauge in the relationship hereinbefore described and as depicted in FIGURES 1 and 2. The gauging elements 26, 27 are in the present instance of thicknesses predetermined to correspond respectively to the web to edge distance of the brake shoes to be employed in assembly 28 and the edge clearance from the platforms 39. Other thicknesses of gauging elements may be alternatively employed in conjunction with different types of brake assemblies.

The arm 12 is next rotated about the spindle and the yoke block slid and locked in various positions along the arm length such that the probe end 19 of the gauging bar will contact a plurality of points on the spider plate 38. As illustrated in full line in FIGURE 2, the probe end 19 contacts the plate at first point, but when rotated to the phantom line position extends beyond the plate. The latter point consequently is not in the same transverse plane as the former point, thus indicating that the spider plate is bent. To correct the condition, the spider plate is bent, as by prying with a screw driver or the like in opposition to the bent condition detected by the gauge. Thereafter, the plate is alternately checked at a plurality of points and deformed until all points are indicated to lie in the same transverse plane by the probe end 19 contacting the plate at all points of the plate. In this connection, it should be noted that some peripheral areas of the lower plate 38 entirely underlie the upper plate 37. Such areas would consequently be inaccessible to the probe end unless provision is made to the contrary. To this end, the probe end 19 is provided with a concentric recess 47 spaced from the end face of the bar by an amount less than the normal spacing of the plates and having a width greater than the thickness of the upper plate. In addition, the combined spacing of the recess from the end face and width of the recess exceeds the distance between the upper surfaces of the plates. The recess 47 thus enables the probe end 19 to extend beneath the upper plate and contact the lower plate in the inaccessible peripheral areas of the lower plate which underlie the upper plate.

After the lower spider plate 38 is trued relative to the spindle, the set screw 22 is loosened and the gauge bar 18 is withdrawn from the yoke block. With the collar 23 remaining clamped in its original position, the gauging elements 26, 27 are removed from the gauge bar. The gauge bar is then reinserted into the yoke block and positioned with the collar in abutment with the yoke as depicted in FIGURE 3. Inasmuch as the gauging elements were of a thickness predetermined to correspond to the web to edge distance of the brake shoe and proper clearance of the shoe edge from the platforms 39, the probe end 19 of the gauge bar is now disposed in a plane in which the platform surfaces should lie if the brake shoes are to be mounted in the assembly with proper clearance from the backing plate. As shown in full line in FIGURE 3, the probe end 19 is in contact with the surface of one of the platforms 39, thus indicating that this platform surface resides in the proper transverse plane relative to the spider plate 38. The arm 12 is then rotated about the spindle and the other platforms checked for coplanar relationship by observing contact of the probe end with the platform surfaces. The phantom line position of the gauge bar is illustrative of a situation where the probe end extends beyond the surface of the platform being checked rather than contacts same. This platform surface is hence displaced from the proper transverse plane within which the surface of the first platform was observed to lie. The backing plate is thus indicated to be bent or otherwise deformed from a proper condition for receiving the brake shoes. The plate is consequently bent or otherwise deformed to counteract the observed deformity, the various platform surfaces being checked with the gauge during the deforming process until they are observed to all lie in the same proper transverse plane as indicated by contact with the probe end of the gauge bar. Brake shoes mounted in the assembly 28 by securing them between the spider plates 37, 38 will thus be everywhere equally spaced at their edges from the lower surface of the backing plate 29 and clear the platforms 39 by the proper amount.

It will be appreciated that various other types of brake assemblies exist wherein the brake shoes are not rendered floating by means of a spider mounting nor is clearance provided between the edges of the shoes and the backing plate. In such assemblies the webs of the brake shoes are usually directly secured to the central raised portion of the backing plate and the edges of the shoes contact the lower peripheral portions thereof. One of these assemblies is illustrated in FIGURE 4, which assembly includes a backing plate 48 having a central raised land portion 49 bordered by a recessed peripheral portion 51. The assembly further includes a flanged axle 52 although such an assembly might in some instances have a spindle axle. Inasmuch as the webs of the brake shoes are directly secured to the land portion 49, and the edges of the shoes are to contact the recessed portion 51, the respective planes of these portions should be everywhere equally spaced by an amount equal to the web to edge spacing of the brake shoes which are to be mounted in the assembly. In order to gauge the backing plate in the manner of the present invention, the arm 12 of the gauge 11 is first secured to the flanged axle. This is accomplished by inserting one of the lug bolts 53 associated with the axle through the arm aperture 44 and into threaded attachment with one of the tapped bores of the axle flange. Thereafter, the use of the gauge is substantially identical to that previously described. It is particularly important to note one basic distinction, however, namely that clearance gauging element 27 is disepnsed with and only the brake shoe web to edge distance element 26 is utilized. More specifically, the element 26 is clamped between the collar 23 and yoke block 14 after the probe end 19 of the gauging bar is brought into contact with the surface of the land portion 49. This surface may now be checked for planarity in the manner previously described. Thereafter the gauging element 26 is removed and the collar brought into abutment with the yoke. The probe end 19 now indicates the proper depth of the surface of recessed portion 51 from that of the land portion and a plurality of points on the recessed portion can be checked for planarity and proper spacing from the land portion.

What is claimed is:

1. A depth gauge comprising an arm adapted to be connected adjacent one end in substantially transverse relation to a spindle, a yoke carried upon said arm, a gauging bar mounted for translation relative to said yoke in right angular relation to said arm and selectively removable from the yoke, a collar mounted on said bar for translation axially of said bar and releasably lockable thereon, and at least one gauging element removably mounted for axial translation on said bar intermediate said collar and yoke.

2. In a brake setting gauge for checking brake assemblies including floating center plane full contact brakes of a type having a support spider including upper and lower parallel spaced support plates for receiving the webs of brake shoes therebetween mounted upon a central raised portion of a backing plate from which an axle spindle centrally extends with the backing plate having raised platforms in a recessed peripheral portion surrounding the raised portion and spaced from the edge of the peripheral portions of brake shoes mounted between the support plates by a predetermined clearance, the combination comprising an arm adapted to be connected adjacent one end in substantially transverse relation to the axle of a brake assembly, a yoke carried upon said arm, a gauging bar mounted for translation relative to said yoke in right angular relation to said arm and selectively removable from the yoke, a collar mounted for translation axially of said bar and releasably lockable thereon, a gauging element removably mounted for translation axially of said bar intermediate said collar and yoke and removable from the bar, said element having a thickness equal to the web to edge distance of a brake shoe, and a second gauging element removably mounted for translation axially of said bar intermediate said collar and yoke and removable from the bar, said second element having a thickness equal to said predetermined clearance of the edge of a brake shoe from the platforms of said floating center plane full contact brakes 3. A gauge according to claim 2, further defined by said gauging bar having a concentric recess spaced from one end thereof by a distance less than the spacing between said spider support plates of a floating center plane full contact brake assembly, said recess having a width greater than the distance between the upper surface spacing of the spider support plates and spacing of the recess from the end of said bar.

4. A gauge according to claim 2, further defined by said arm having apertures adjacent its end regions of sizes to respectively receive a tapered axle spindle, and a lug bolt of a flanged axle.

References Cited in the file of this patent

UNITED STATES PATENTS

| 1,225,835 | Luck | May 15, 1917 |
| 1,554,610 | Webster | Sept. 22, 1925 |
| 1,786,638 | Wadell | Dec. 30, 1930 |
| 2,087,497 | Blackman | July 20, 1937 |
| 2,089,790 | Halpern | Aug. 10, 1937 |
| 2,885,773 | Milinaro | May 12, 1959 |

FOREIGN PATENTS

| 843,665 | France | Apr. 3, 1939 |